United States Patent
Schnabel et al.

(10) Patent No.: US 6,921,055 B2
(45) Date of Patent: Jul. 26, 2005

(54) METHOD FOR SECURING FRAME MEMBERS FOR AN ELECTRICAL CABINET

(75) Inventors: John David Schnabel, Fareham (GB); John Richard Parkin, Christchurch (GB)

(73) Assignee: APW Electronics Limited, Hampshire (GB)

( * ) Notice: Subject to any disclaimer, the term of this patent is extended or adjusted under 35 U.S.C. 154(b) by 0 days.

(21) Appl. No.: 10/657,642

(22) Filed: Sep. 8, 2003

(65) Prior Publication Data

US 2004/0051016 A1 Mar. 18, 2004

Related U.S. Application Data

(62) Division of application No. 09/869,618, filed on Mar. 25, 2002.

(30) Foreign Application Priority Data

Dec. 30, 2001 (GB) ............................................... 9828841

(51) Int. Cl.⁷ ..................... A47B 96/00; H02K 15/00; B26D 3/00
(52) U.S. Cl. ......................... 248/224.8; 29/596; 83/54
(58) Field of Search ............................... 403/219, 231; 248/188, 224.8, 220.22, 225.1, 225.21, 235, 250; 29/516, 596; 72/55; 83/54; 312/257.1, 265.5; 211/189

(56) References Cited

U.S. PATENT DOCUMENTS

| | | | | |
|---|---|---|---|---|
| 2,065,915 A | * | 12/1936 | Weston | 29/890.142 |
| 2,507,859 A | * | 5/1950 | Keller | 29/890.15 |
| 3,574,378 A | * | 4/1971 | Heywood | 403/231 |
| 3,901,613 A | * | 8/1975 | Andersson | 403/178 |
| 4,036,514 A | * | 7/1977 | Hannover | 285/222 |
| 4,278,361 A | * | 7/1981 | Steinke | 403/189 |
| 4,345,956 A | * | 8/1982 | Cox et al. | 156/198 |
| 4,521,041 A | * | 6/1985 | Cox et al. | 285/133.21 |
| 4,669,697 A | | 6/1987 | Suzuki et al. | |
| 5,380,083 A | | 1/1995 | Jones et al. | |
| 5,425,520 A | | 6/1995 | Masumoto | |
| 6,430,812 B1 | * | 8/2002 | Sanders | 29/890.148 |
| 2004/0124319 A1 | * | 7/2004 | Hofmann et al. | 248/49 |

FOREIGN PATENT DOCUMENTS

| | | |
|---|---|---|
| DE | 1 848 964 | 9/1961 |
| EP | 0 012 209 | 11/1979 |
| EP | 0 012 209 A | 6/1980 |
| EP | 0 189 061 | 12/1988 |
| GB | 1 119 889 | 7/1968 |
| GB | 1 217 337 | 12/1970 |
| GB | 2 057 044 | 3/1981 |
| GB | 2 072 059 | 9/1981 |
| GB | 2 160 765 A | 1/1986 |
| GB | 2 236 374 | 4/1991 |
| GB | 2 321 004 | 7/1998 |

* cited by examiner

Primary Examiner—Anita M. King
(74) Attorney, Agent, or Firm—Quarles & Brady LLP

(57) ABSTRACT

In a cabinet having vertically extending side members (5) forming part of a chassis of the cabinet, panel mounts (1), also to extend vertically in the cabinet and to have panels mounted thereupon, are mountable to the side members (5) by integral members (3) which extend parallel to the outer face of the panel mount (1) at a spacing from the outer face and in a direction perpendicular to the longitudinal extent of the panel mount (1), i.e., horizontally. The integral members (3) are engaged in respective apertures in the side members (5) or in braces (7) extending between the side members (5) followed by forward or rearward movement to effect securement, retaining means such as pins or studs then being inserted in aligned bores (8, 9) in the panel mounts (1) and side members (5) to prevent return movement.

7 Claims, 8 Drawing Sheets

US 6,921,055 B2

METHOD FOR SECURING FRAME MEMBERS FOR AN ELECTRICAL CABINET

This application is a divisional of U.S. patent application Ser. No. 09/869,618 filed Mar. 25, 2002, which is hereby incorporated by reference in its entirety.

BACKGROUND OF INVENTION

The invention relates to electrical cabinets.

Electrical cabinets are used for receiving electronic and electrical components particularly but not exclusively for the operation of local data networks. The components such as sub-racks with electronic and electrical components, fans and other accessories are mounted within the cabinet on internal frames and the cabinets generally have side panels, a door and end panels and are mounted on a frame which preferably comprises upper and lower end members and vertically extending side members preferably provided one towards the front and the other towards the rear at each lateral side of the cabinet.

SUMMARY OF THE INVENTION

According to one aspect of the invention, panel mounts, comprising members to extend vertically within the cabinet and having attachment means whereby panels can be mounted thereupon, are mounted to the side members of the cabinet by integral members which extend substantially parallel to the outer face of the panel mount at a spacing from the outer face and in a direction perpendicular to the longitudinal extent of the panel mount, such integral members each being engaged in a respective aperture in the side members or braces extending between the side members at one lateral side of the cabinet, followed by movement forwardly or rearwardly to secure the panel mount to the side members, retaining means such as a pin or stud then being inserted in aligned bores in the panel mounts and side members or braces to prevent return movement in said forward or rearward directions.

Such method of securement can have the advantage over previously proposed methods which involved vertical movement of the panel mounts to secure them, that panel mounts of the full height of the side members can be secured to the side members where previously, due to the vertical movement experienced during the engagement, it was necessary for the panel mount to be significantly shorter than the side member. The panel mounts, which generally define a 483 mm (19 inch) wide mounting, can thus be secured at various locations in the depth of the cabinet and can extend for the full height of the side members.

Preferably the apertures in the side members or braces are spaced at 25 mm horizontal spacing to set the locations at which the panel mounts can be secured at 25 mm spacings.

Advantageously the braces have horizontally elongate slots therein in addition to the apertures whereby the braces can be secured by fastenings means, such as bolts, extending through the slots whereby the braces are horizontally movable with respect to the side members to permit the panel mounts to be secured at any desired location in the depth of the cabinet.

According to another aspect of the invention in an electrical cabinet chassis supports, for example for supporting shelves, are provided in the form of cantilevers by providing the chassis supports with vertically spaced securing hooks which together are capable of preventing pivoting movement of a mounted article such as a shelf.

The vertically spaced hooks may project longitudinally of a wall of the chassis support and parallel thereto to be engaged in respective apertures in a member from which they are to be supported.

According to a further aspect of the invention, means to secure in abutment two rectangular section tubular metal members with their longitudinally axes mutually at right angles comprises punching or drilling at least two first holes in one wall of each of the metal members, acting through the first holes so formed to burst a respective second hole to each first hole in the opposite wall of the metal members to form an outwardly extending collar, screw threading the second holes in one of the members, engaging the collars of the other of the members in the first holes of said one of the members and engaging a bolt through the aligned first and second holes of said one and said other members to engage the screw thread in the collar of said one of the members to clamp the members together.

According to a still further aspect of the invention, in an electrical cabinet a method of hanging a vertical side panel comprising engaging a top flange of the side panel, which top flange has a horizontal portion and a vertical return, over an upper suspension member of a frame of the cabinet and engaging a horizontal lower flange of the side panel with an upturned hook portion at the lower end of the frame of the cabinet so that the upturned hook projects upwardly through an aperture in the horizontal lower flange.

Preferably the aperture in the horizontal lower flange is aligned with a cutout in a free edge of the flange and engagement is effected by engaging the hook in the cutout and then slightly raising the side panel while pushing it inwardly towards the cabinet before lowering the side panel downwardly onto the hook.

The upper suspension member of the frame may be provided at the upper end of vertical side members of the frame or may be provided on extension pieces which are supported by the vertical side members and project laterally outwardly to extend the width of the cabinet beyond the side members. By using such extension pieces extra wiring accommodating spaces can be provided at one or both of the sides of a cabinet.

The extension pieces can have hooks to engage over the upper edge of the side members, preferably in a recess so that such upper edges are below the upper extremity of the side members, and be bolted to the side members to retain them in position. Preferably each extension piece can be used as either an upper or a lower extension piece.

BRIEF DESCRIPTION ON THE DRAWINGS

The invention is diagrammatically illustrated by way of example in the accompanying drawings, in which.

DETAILED DESCRIPTION OF THE INVENTION

Figure 1:
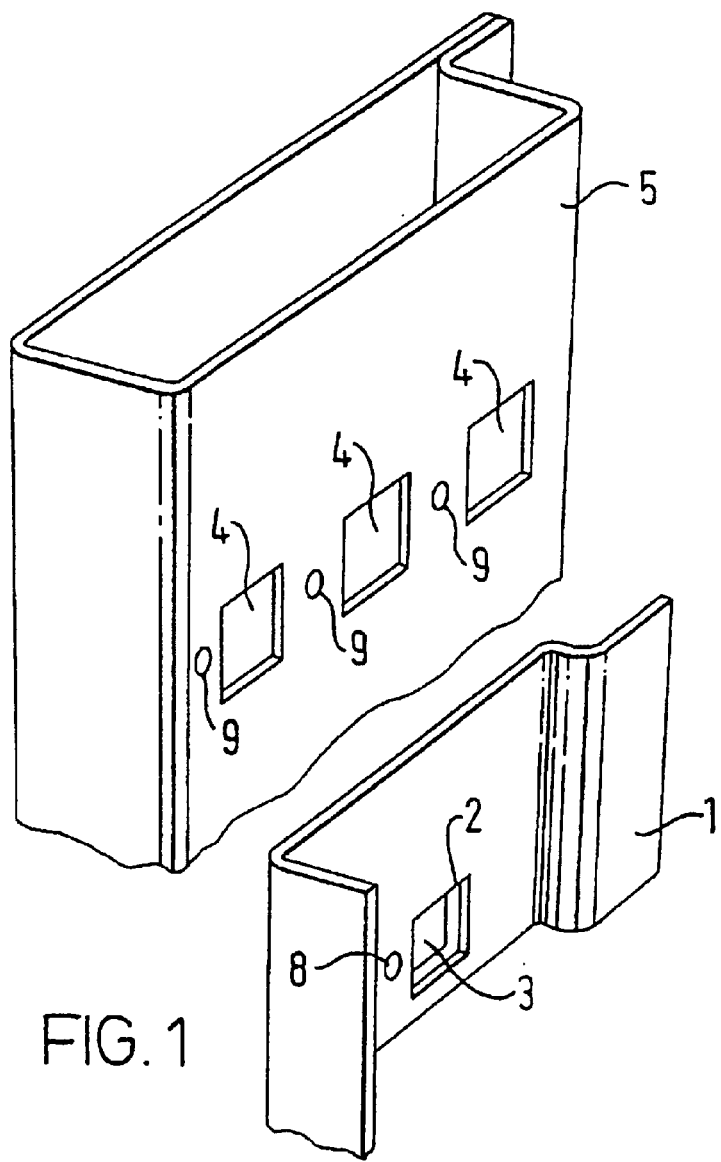
FIG. 1 is a perspective view of a panel mount with attachment means and a side member on which it can be mounted according to the invention.
Figure 1A:
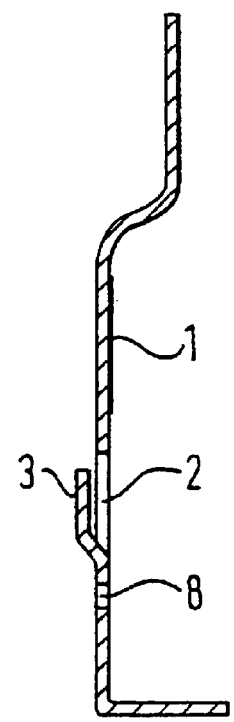
FIG. 1a is a sectional end view of the panel mount of FIG. 1.
Figure 2:
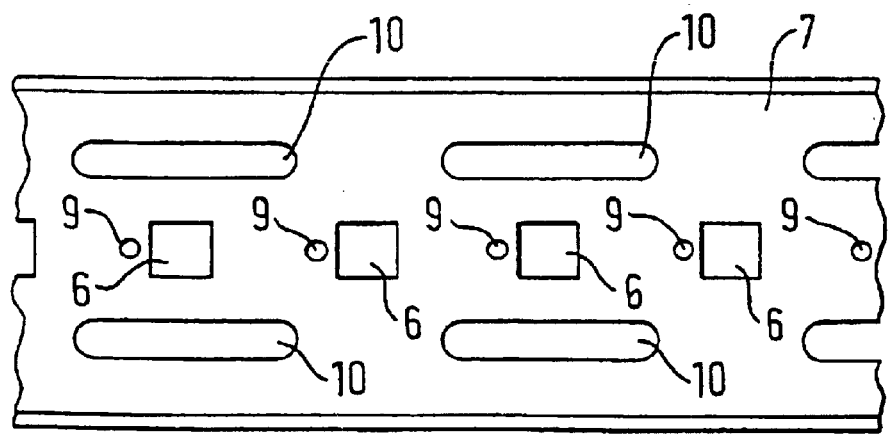
FIG. 2 is an elevation of a brace to which the panel mount of FIG. 1 can be secured.

Referring to the drawings and firstly to FIGS. 1 and 2, a panel mount 1 is a generally angular section strip of metal and in one face has a three sided cutout 2 with the portion of the wall cut out, bent outwardly and bent back to form a tongue 3 which extends parallel to the wall in which the cutout 2 is formed. The tongue 3 can be inserted in any one of horizontally spaced apertures in a vertical side member 5 forming part of the frame of an electrical cabinet or can be inserted in any one of horizontally spaced apertures 6 in a brace 7 which can be secured to the side members of the frame of an electrical cabinet on one side of the cabinet to extend between a front side member and a rear side member. The apertures 4 or 6 are spaced at a pitch of 25 mm and thus the panel mount 1 can be supported on the side member 5 of the brace 7 by inserting the tongue 3 in an aperture 4 or 6 and then moving the panel mount 1 to cause the tongue 3 to move behind the web of the side member 5 or the brace 7 in which the aperture 4 or 6 is formed. The panel mount 1 does thus not need to be moved vertically to secure it and can be of the same length as the side members so as to extend completely between upper and lower frame members of the cabinet. A through aperture 8 may be provided in the panel mount 1 through which a pin or clip (not shown) can be inserted to engage in an aperture 9 provided alongside the aperture 4 or 6 in which the tongue 3 is engaged thereby to prevent return movement which would free the tongue from the aperture 4 or 6. Elongate slots 10 in the brace 7 can be used to secure the brace 7 by bolts to the side members, the length of the slots 10 allowing longitudinal shifting of the brace 7 with respect to the side members to allow stepless positioning of the panel mounts with respect to the side members 5.

Figure 3:
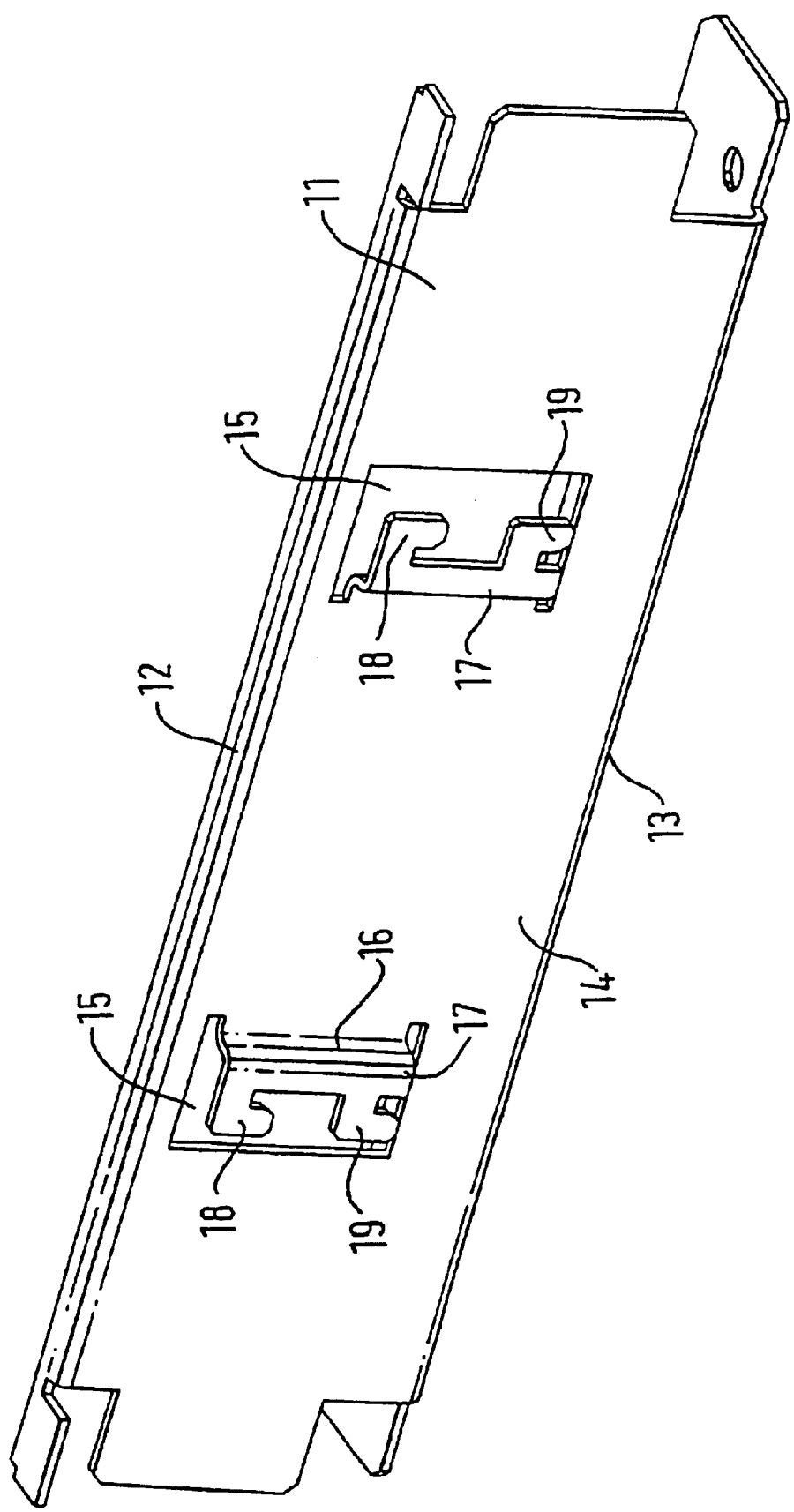
FIG. 3 is a perspective view of an inner face of a chassis support with cantilever engagement hooks.
Figure 4:
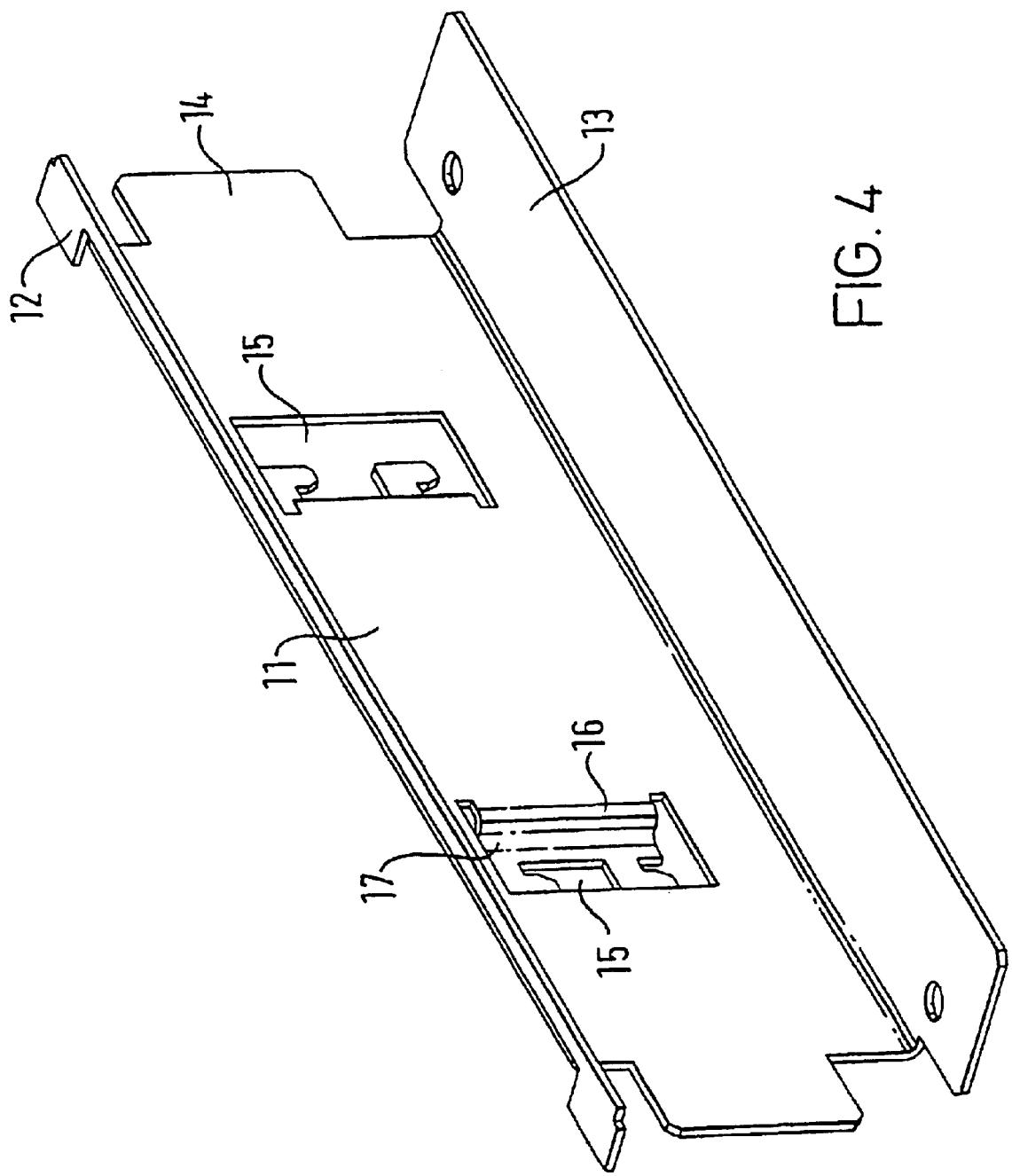
FIG. 4 is a view of the chassis support of FIG. 3 from the other side.

Referring to FIGS. 3 and 4, a chassis support 11 is shown which comprises upper and lower flanges 12 and 13 above and below a vertical web 14. In the web 14 two cutouts 15 are formed by cutting around three sides and the member formed by each cutout is pressed out of the plane of the web 14 by a bend 16 and a further bend 17 and the tongue so formed which extends parallel to the web 14 but spaced therefrom is cut away to form upper and lower hooks 18, 19. By providing the two spaced hooks the chassis support 11 can be engaged in two vertically spaced apertures and then moved downwardly so that the chassis support 11 is cantilevered from a pair of the hooks 18, 19 and can resist tilting forces applied thereto. Although the chassis support 11 is shown as having two cutouts 15 and two pairs of hooks 18, 19 it is only envisaged that one or other of the pairs of hooks would be used at any one time but by providing two cutouts the chassis support 11 can act as a lefthanded chassis support or a righthanded chassis support. The chassis supports 11 are particularly suitable for supporting shelves in electrical cabinets.

Figure 5:
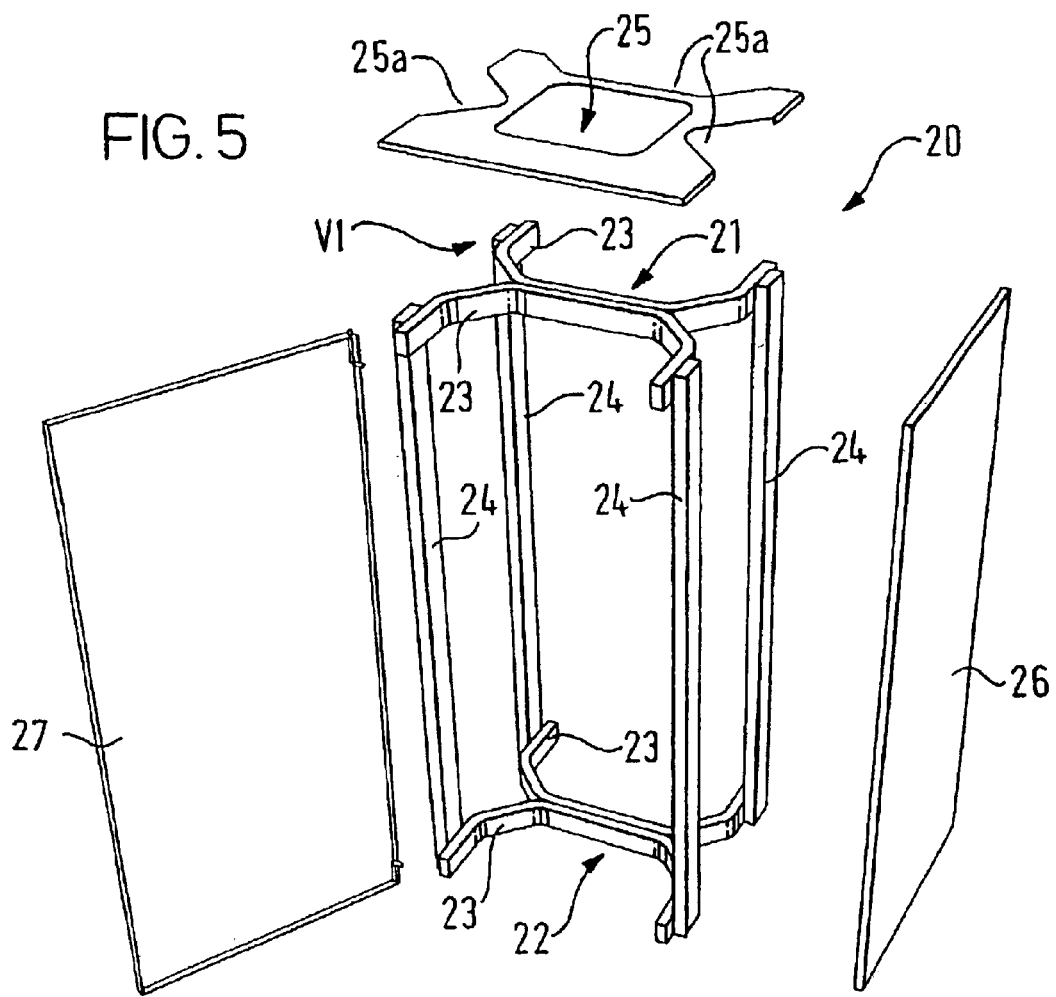
FIG. 5 is an exploded view showing components of an electrical cabinet.

Referring to FIG. 5, an electrical cabinet 20, shown in exploded form, comprises an upper frame 21 and lower frame 22 each formed by back-to-back U-shaped members 23 of tubular metal, four side members 24 extending between the upper frame 2 and the lower frame 22, an upper member 25 with cutouts 25a in three of the walls thereof, removable side panels 26 only one of which is shown and a removable door 27 which closes the front of the cabinet.

Figure 6:
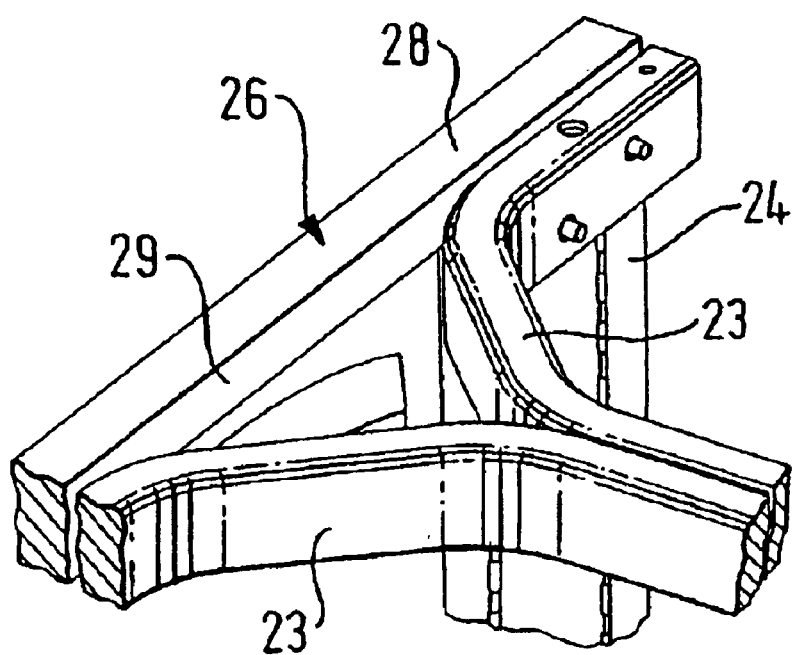
FIG. 6 is a view of the portion of FIG. 5 indicated by the arrow VI but with a panel hung thereon.

As can be seen in FIG. 6, the side panel 26 has an upper horizontal flange 28 with a return vertical flange 29, the panel 26, 28, 29 enveloping the two side members 24 on that side of the frame of the cupboard.

Figure 7:
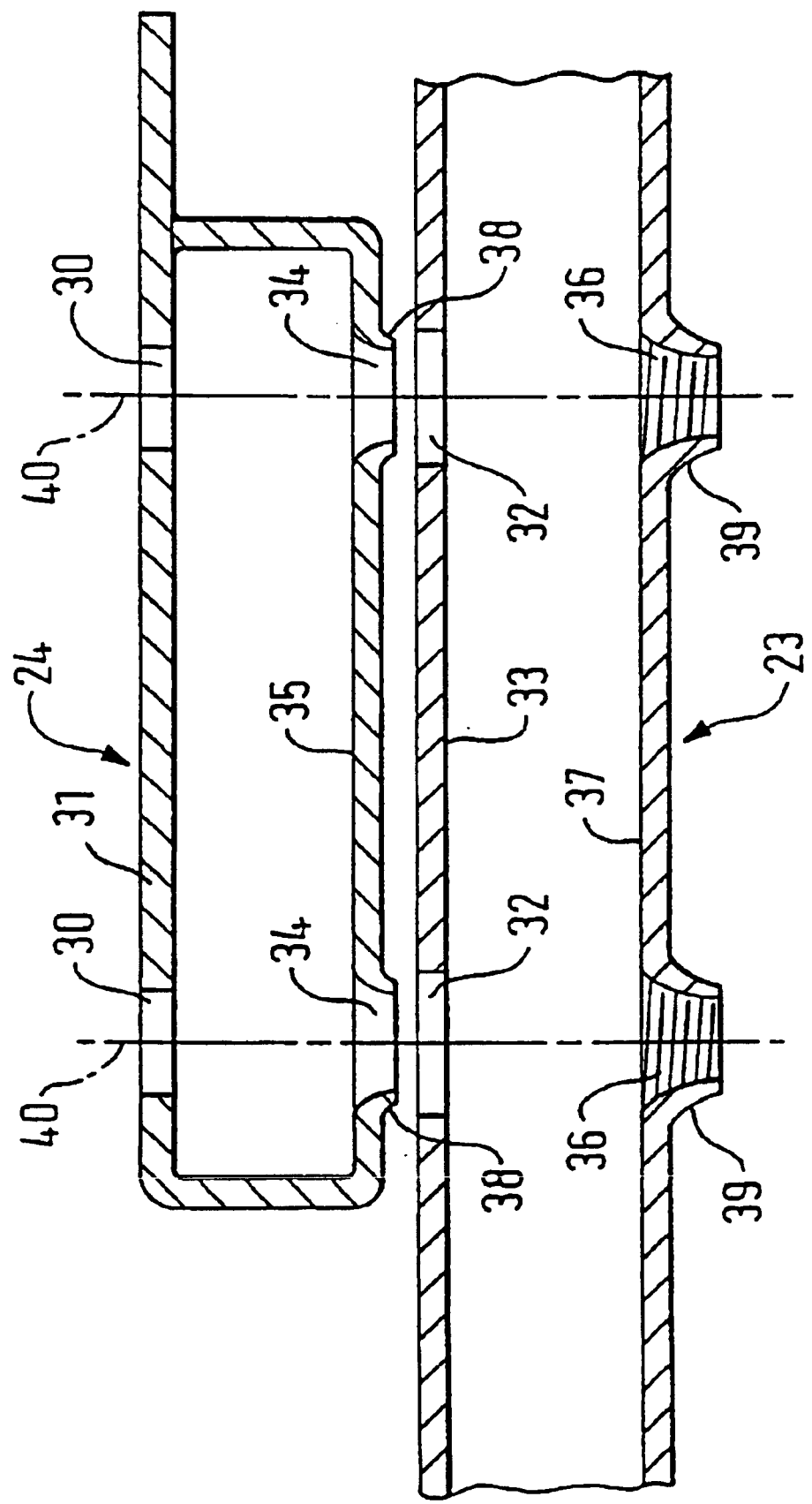
FIG. 7 is a sectional view through two of the components shown in FIG. 6.

FIG. 7 shows the means whereby each of the U-shaped members 23 which extend horizontally can be mounted to the respective side members 24 which extend vertically. Two first holes 30 are punched or drilled in one wall 31 of the side member 24 and two first holes 32 are punched or drilled in one wall 33 of the U-shaped member 23. Operating through the first holes 30, 32, second holes 34 are then burst through the second wall 35 of the side members 24 and second holes 36 are burst through the second wall 37 of the U-shaped member 23. Bursting the holes in this way forms collars 38 at the outsides of the holes 34 and collars 39 at the outside of the holes 36. The holes 36 are then screw threaded. When the members 23, 24 are pressed together the collars 38 on the side members 24 are a push fit into the first holes 32 in the U-shaped member 23 so that when bolts (not shown) are inserted along the aligned axis 40 of each of the holes 30, 34, 32, 36 to pull the members 23, 24 tightly into engagement with one another, the members 23, 24 are locked accurately at right angles one to the other without any play such that even a tall framework of U-shaped members 23 and side members 24, for example two meters tall, can stand rigidly without a tendency for the upper frame to move sideways or from to rear due to the connections being less than entirely rigid. The collars 38 can however have a tapering formation such that great precision is not required in the formation of the holes and collars.

Figure 8:
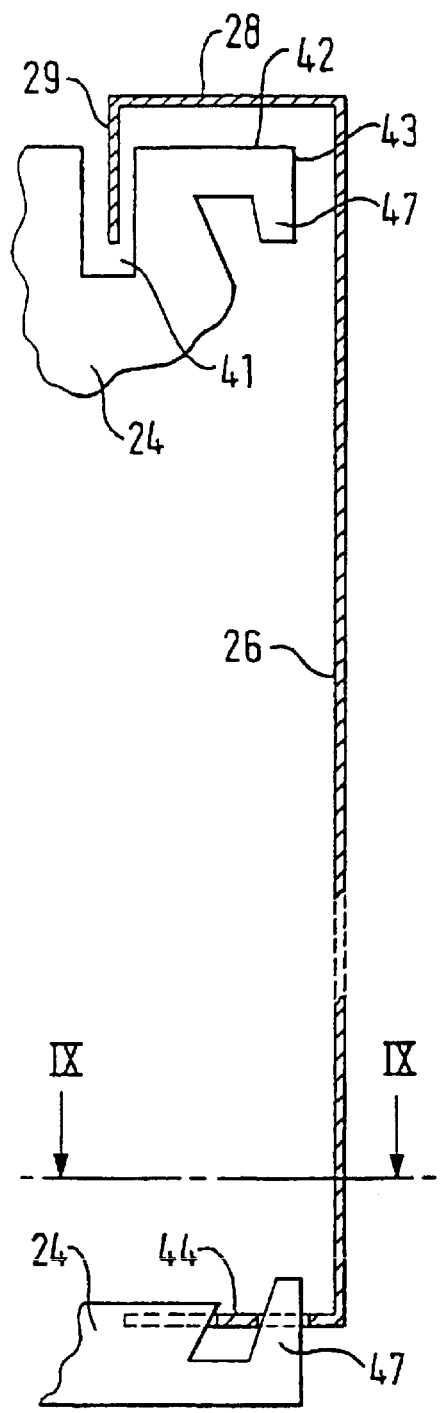
FIG. 8 is a schematic view indicating hanging of a vertical side panel of an electrical cabinet by a method according to the invention.
Figure 9:
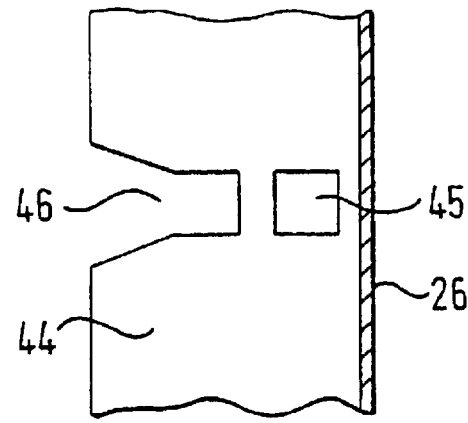
FIG. 9 is a sectional view taken on line IX—IX of FIG. 8.
Figure 10:
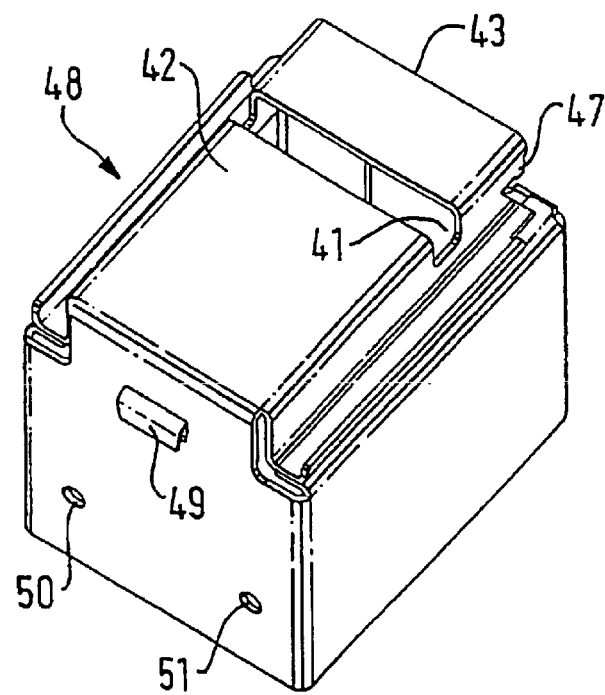
FIG. 10 is a perspective view from above and an inner face of an extension member of an electrical cabinet according to the invention in a position to form an upper extension member.

Referring to FIGS. 8 to 12, the upper and bottom end of each side member 24 is provided with a formation similar to that shown in FIG. 10 at the righthand side thereof, that is to say it has a groove 41 in the upper face 42 stepped back from a front upper corner 43. The formation shown in FIG. 10 is an extension piece to be hung on the upper or lower end of one of the side members 24.

Referring to FIG. 8, the side panel 26 shown has its horizontal upper flange 28 overlapping the upper surface 42 of the side member 24 and its vertical flange 29 engaged in the groove 41 of the upper end of the side member 24. At the lower end the side panel 26 has a horizontal flange 44 which, as shown in FIG. 9, has, in alignment with each of the side members 24, apertures 45 and cutouts 46. At each side of the side member 24 both at the upper and at the lower end a hook 47 is provided. The hook 47 at the upper end has no function but that at the lower end engages in a respective one of the apertures 45. With reference again to FIG. 8 the method of engagement is that the panel 26 is first hooked onto the upper end of the side member so that the vertical flange 29 engages in the groove 41. The bottom end of the panel 26 is then pushed inwardly to engage the hooks 47 in the cutouts 46, a flared mouth of the cutouts 46 assisting this alignment. The side panel 26 is then raised slightly and pushed inwardly so that the hook 47 at the lower end of the side member 24 can engage in the respective aperture 45 in the bottom flange 44 of the side panel 26. The side panels 26 can thus quickly and easily be engaged with or disengaged from the framework of the cabinet. It will be seen that the hooks 47 taper down towards their free ends such that the weight of the panel engages the edges of the apertures 45 both with the outer and with the inner faces of the hook 47 so that vibration will not cause rattling of the panel.

Figure 11:
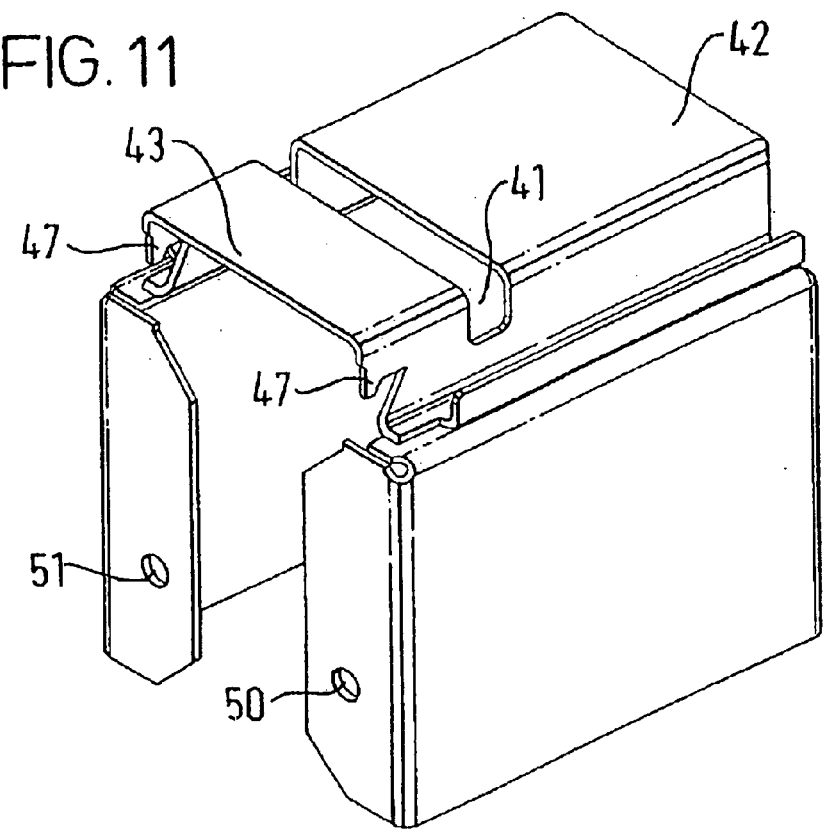
FIG. 11 is a view from the other side of the extension member of FIG. 10 also orientated so as to form an upper member.
Figure 12:
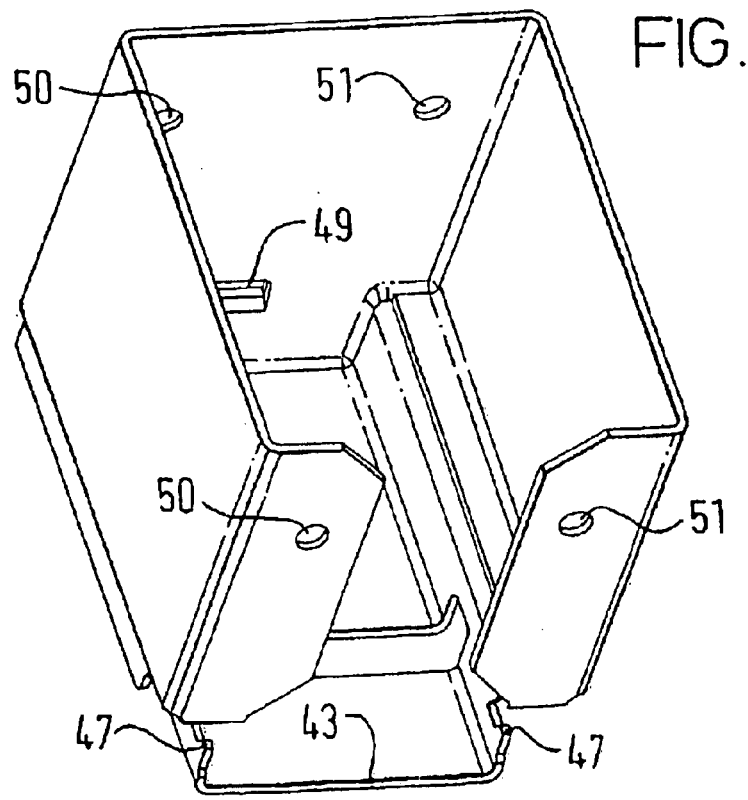
FIG. 12 is a view of the extension member shown in FIGS. 10 and 11 but in an orientation to form a lower extension member.

Referring now also to FIGS. 11 and 12, the extension pieces 48 have, in addition to the groove 41, the top face 42, the front edge 43 and the hooks 47 previously described, a bent out tongue 49 and aligned apertures 50, 51 by means of which they can be hooked onto and bolted to the outer face of the upper and lower ends of the side members 24. The extension pieces 48 are preferably 100 mm between the front edge 43 and the upper edge of the face in which the tongue 49 is provided whereby they can space the side panels 26 outwardly from the side members 24 by 100 mm to give an additional space for extra wiring or other purposes. A blanking plate can extend between the door of the cabinet and the extended position of the side panels 26 to fill 100 mm space at the front. If two adjacent cabinets are each provided with extension pieces 48 on their adjacent sides then the two cabinets can be accurately spaced apart by 200 mm to form a wiring space therebetween, a suitable blanking plate being provided to cover the space to the front.

What is claimed is:

1. A method of securing in abutment two tubular metal members, comprising the steps of forming at least two first holes in one wall of each of the metal members, acting through the first holes so formed to burst second holes, respective to each of the first holes, in the opposite walls of the metal members to form outwardly-extending collars, screw threading the collar in one of the metal members, engaging the collars of the other of the metal members in the first hole of one of the metal members, and engaging threaded fasteners through respective ones of the aligned first and second holes in the metal members to engage the screw threads in the collar of the one of the metal members to clamp the metal members together.

2. The method as defined in claim 1, wherein the step of threading the collar comprises the step of threading the outermost second hole.

3. The method as defined in claim 1, further comprising the steps of aligning the tubular members in abutment such that the collar in a first of the two tubular members is received in the first hole in the second of the two tubular members and the collar in the second member is threaded to receive the threaded fastener.

4. The method as defined in claim 1, wherein the step of securing in abutment two tubular members comprises securing in abutment two rectangular tubular metal members.

5. The method as defined in claim 1, wherein the step of engaging a threaded fastener through respective ones of the aligned first and second holes in the metal members comprises the step of engaging a bolt through respective ones of the aligned first and second holes in the metal members.

6. The method as defined in claim 1, wherein the step of forming at least two first holes comprises punching or drilling the at least two first holes.

7. The method as defined in claim 6, further comprising the step of arranging the tubular metal members to have longitudinal axes extending at mutually right angles.

\* \* \* \* \*

UNITED STATES PATENT AND TRADEMARK OFFICE
CERTIFICATE OF CORRECTION

PATENT NO. : 6,921,055 B2
DATED : July 26, 2005
INVENTOR(S) : John David Schnabel et al.

It is certified that error appears in the above-identified patent and that said Letters Patent is hereby corrected as shown below:

Column 4,
Line 11, "2" should be -- 21 --.

Signed and Sealed this

Eighteenth Day of April, 2006

JON W. DUDAS
*Director of the United States Patent and Trademark Office*